(12) United States Patent
Herr et al.

(10) Patent No.: US 9,973,574 B2
(45) Date of Patent: *May 15, 2018

(54) PACKET FORWARDING OPTIMIZATION WITHOUT AN INTERVENING LOAD BALANCING NODE

(71) Applicant: International Business Machines Corporation, Armonk, NY (US)

(72) Inventors: David A. Herr, Cary, NC (US); Grant S. Mericle, Durham, NC (US); Bruce H. Ratcliff, Red Hook, NY (US); Benjamin T. Rau, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/813,497

(22) Filed: Nov. 15, 2017

(65) Prior Publication Data

US 2018/0063230 A1    Mar. 1, 2018

Related U.S. Application Data

(63) Continuation of application No. 14/928,231, filed on Oct. 30, 2015.

(51) Int. Cl.
*H04L 29/08* (2006.01)
*H04L 12/863* (2013.01)
(Continued)

(52) U.S. Cl.
CPC .......... *H04L 67/1002* (2013.01); *H04L 45/74* (2013.01); *H04L 47/50* (2013.01); *H04L 61/2007* (2013.01)

(58) Field of Classification Search
CPC ..... H04L 67/1002; H04L 45/74; H04L 47/50; H04L 61/2007
(Continued)

(56) References Cited

U.S. PATENT DOCUMENTS 5,944,783 A * 8/1999 Nieten .................... G06F 9/546
709/202
2004/0260745 A1* 12/2004 Gage ................. H04L 29/12009
709/200

(Continued)

OTHER PUBLICATIONS

List of IBM Patents or Patent Applications Treated As Related; dated Nov. 15, 2017, pp. 1-2.

*Primary Examiner* — Sai Ming Chan
(74) *Attorney, Agent, or Firm* — Cantor Colburn LLP

(57) ABSTRACT

According to some embodiments, a computer-implemented method for packet forwarding optimization across multiple nodes may include receiving, via a processor on a network controller, a first packet from a client. The first packet can include information indicative of a target node and a protocol type. The method may further include receiving, via the processor, a balancing node from a packet engine, forwarding, via the processor, the first packet to the target node though the balancing node according to a balancing node address, a target node address, and the protocol type, receiving, via the processor, a registration from the packet engine, and saving the registration to a network controller queue, and forwarding, via the network controller queue, a second packet to the target node based on the registration without the second packet traversing the balancing node.

1 Claim, 6 Drawing Sheets

(51) Int. Cl.
*H04L 29/12* (2006.01)
*H04L 12/741* (2013.01)
(58) Field of Classification Search
USPC .......................................................... 370/389
See application file for complete search history.

(56) References Cited

U.S. PATENT DOCUMENTS

2013/0198409 A1* 8/2013 Holliday ............. H04L 61/1511
709/238
2016/0094513 A1* 3/2016 Friedel ................ H04L 61/2503
709/245
2017/0126791 A1 5/2017 Herr et al.

* cited by examiner

PACKET FORWARDING OPTIMIZATION WITHOUT AN INTERVENING LOAD BALANCING NODE

DOMESTIC PRIORITY

This application is a continuation of U.S. patent application Ser. No. 14/928,231, entitled "PACKET FORWARDING OPTIMIZATION WITHOUT AN INTERVENING LOAD BALANCING NODE," filed Oct. 30, 2015, the disclosure of which is incorporated by reference herein in its entirety.

BACKGROUND

The present disclosure relates to packet load optimization, and more specifically, to packet forwarding optimization across multiple nodes without an intervening load balancing node.

Connection load balancing is vital for many mainframe operating systems. For example, load balancing is often desirable because many mainframe operating systems are deployed in clustered configurations. In clustered configurations, a load balancer may direct packet traffic through a particular load balancing node, which may be configured to make efficiency decisions with respect to the packet forwarding to a target address within the cluster.

Some conventional approaches have provided a performance benefit by bypassing the TCP/IP stack for packets once the target had been selected. Using this approach, however, the packets are still processed by a load-balancing node, although the TCP/IP stack is avoided. In other conventional systems, an inbound workload queuing functionality may improve packet distribution performance by sending packets destined for the load balancing node to a special buffer operating as an external network appliance. However, with inbound workload queuing, packets may still be processed by the external network appliance, which may not benefit throughput more than an intervening balancing node. Conventional packet load systems and methods that pass packet traffic through one or more intermediary balancing nodes or appliances may not provide optimal packet optimization across multiple nodes.

SUMMARY

According to some embodiments, a computer-implemented method for packet forwarding optimization across multiple nodes is described. The method may include receiving, via a processor on a network controller, a first packet from a client. The first packet can include information indicative of a target node and a protocol type. The method may further include receiving, via the processor, a balancing node from a packet engine, forwarding, via the processor, the first packet to the target node though the balancing node according to a balancing node address, a target node address, and the protocol type, receiving, via the processor, a registration from the packet engine, and saving the registration to a network controller queue, and forwarding, via the network controller queue, a second packet to the target node based on the registration without the second packet traversing the balancing node.

According to other embodiments, a system for packet forwarding optimization across multiple nodes utilizing a single internet protocol (IP) address may include a network controller that includes a processor. The processor may be configured to receive a first packet from a client, wherein the first packet includes information indicative of a target node address and a protocol type, receive a balancing node address from a packet engine, forward first packet to the target node though the balancing node according to a balancing node address, a target node, and the protocol type, receive a registration from the packet engine and save the registration to a network controller queue, and forward, via the network controller queue, a second packet to the target node based on the registration without the second packet traversing the balancing node.

According to yet other embodiments, a non-transitory computer-readable storage medium may store executable instructions that, when executed by a computer, perform a method for packet forwarding optimization across multiple nodes utilizing a single internet protocol (IP) address. The method may include receiving, via a processor on a network controller, a first packet from a client. The first packet can include information indicative of a target node and a protocol type. The method may further include receiving, via the processor, a balancing node from a packet engine, forwarding, via the processor, the first packet to the target node though the balancing node according to a balancing node address, a target node address, and the protocol type, receiving, via the processor, a registration from the packet engine, and saving the registration to a network controller queue, and forwarding, via the network controller queue, a second packet to the target node based on the registration without the second packet traversing the balancing node.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
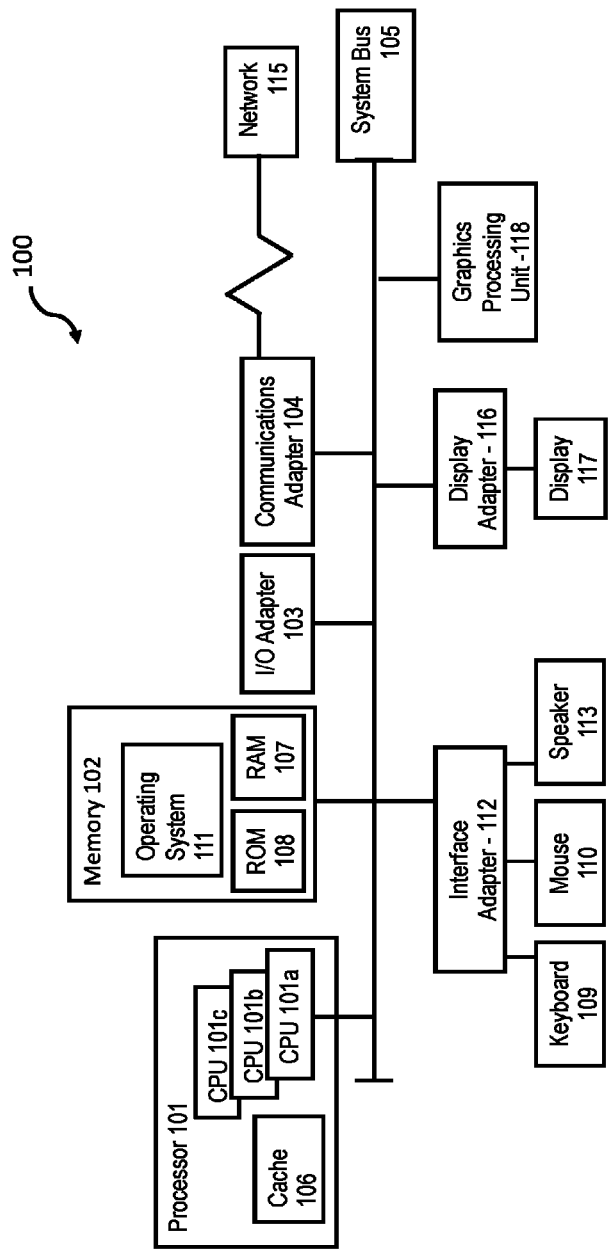
FIG. 1 illustrates a block diagram of a computer system for use in practicing the teachings herein.

FIG. 1 illustrates a block diagram of a computer system 100 (hereafter "computer 100") for use in practicing the embodiments described herein. The methods described herein can be implemented in hardware, software (e.g., firmware), or a combination thereof. In an exemplary embodiment, the methods described herein are implemented in hardware, and may be part of the microprocessor of a special or general-purpose digital computer, such as a personal computer, workstation, minicomputer, or mainframe computer. Computer 100 therefore can embody a general-purpose computer. In another exemplary embodiment, the methods described herein are implemented as part of a mobile device, such as, for example, a mobile phone, a personal data assistant (PDA), a tablet computer, etc.

In an exemplary embodiment, in terms of hardware architecture, as shown in FIG. 1, the computer 100 includes processor 101. Computer 100 also includes memory 102 coupled to processor 101, and one or more input and/or output (I/O) adaptors 103, that may be communicatively coupled via a local system bus 105. Memory 102 may be operatively coupled to one or more internal or external memory devices. Communications adaptor 104 may be operatively connect computer 100 to one or more networks 115. System bus 105 may also connect one or more user interfaces via interface adaptor 112. Interface adaptor 112 may connect a plurality of user interfaces to computer 100 including, for example, keyboard 109, mouse 110, speaker 113, etc. System bus 105 may also connect display adaptor 116 and display 117 to processor 101. Processor 101 may also be operatively connected to graphical processing unit 118.

Processor 101 is a hardware device for executing hardware instructions or software, particularly that stored in a non-transitory computer-readable memory (e.g., memory 102). Processor 101 can be any custom made or commercially available processor, a central processing unit (CPU), a plurality of CPUs, for example, CPU 101a-101c, an auxiliary processor among several other processors associated with the computer 100, a semiconductor based microprocessor (in the form of a microchip or chip set), a macroprocessor, or generally any device for executing instructions. Processor 101 can include a memory cache 106, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 106 may be organized as a hierarchy of more cache levels (L1, L2, etc.).

Memory 102 can include random access memory (RAM) 107 and read only memory (ROM) 108. RAM 107 can be any one or combination of volatile memory elements (e.g., DRAM, SRAM, SDRAM, etc.). ROM 108 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 102 may incorporate electronic, magnetic, optical, and/or other types of non-transitory computer-readable storage media. Note that the memory 102 can have a distributed architecture, where various components are situated remote from one another, but can be accessed by the processor 101.

The instructions in memory 102 may include one or more separate programs, each of which comprises an ordered listing of computer-executable instructions for implementing logical functions. In the example of FIG. 1, the instructions in memory 102 may include a suitable operating system 111. Operating system 111 can control the execution of other computer programs and provides scheduling, input-output control, file and data management, memory management, and communication control and related services.

Input/output adaptor 103 can be, for example but not limited to, one or more buses or other wired or wireless connections, as is known in the art. The input/output adaptor 103 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

Interface adaptor 112 may be configured to operatively connect one or more I/O devices to computer 100. For example, interface adaptor 112 may connect a conventional keyboard 109 and mouse 110. Other output devices, e.g., speaker 113 may be operatively connected to interface adaptor 112. Other output devices may also be included, although not shown. For example, devices may include but are not limited to a printer, a scanner, microphone, and/or the like. Finally, the I/O devices connectable to interface adaptor 112 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

Computer 100 can further include display adaptor 116 coupled to one or more displays 117. In an exemplary embodiment, computer 100 can further include communications adaptor 104 for coupling to a network 115.

Network 115 can be an IP-based network for communication between computer 100 and any external device. Network 115 transmits and receives data between computer 100 and devices and/or systems external to computer 100. In an exemplary embodiment, network 115 can be a managed IP network administered by a service provider. Network 115 may be a network internal to an aircraft, such as, for example, an avionics network, etc. Network 115 may be implemented in a wireless fashion, e.g., using wireless protocols and technologies, such as WiFi, WiMax, etc. Network 115 may also be a wired network, e.g., an Ethernet network, an ARINC 429 network, a CAN, etc., having any wired connectivity including, e.g., an RS232 connection, R5422 connection, etc. Network 115 can also be a packet-switched network such as a local area network, wide area network, metropolitan area network, Internet network, or other similar type of network environment. The network 115 may be a fixed wireless network, a wireless local area network (LAN), a wireless wide area network (WAN) a personal area network (PAN), a virtual private network (VPN), intranet or other suitable network system.

If computer 100 is a PC, workstation, laptop, tablet computer and/or the like, the instructions in the memory 102 may further include a basic input output system (BIOS) (omitted for simplicity). The BIOS is a set of essential routines that initialize and test hardware at startup, start operating system 111, and support the transfer of data among the operatively connected hardware devices. The BIOS is stored in ROM 108 so that the BIOS can be executed when computer 100 is activated. When computer 100 is in operation, processor 101 may be configured to execute instructions stored within the memory 102, to communicate data to and from the memory 102, and to generally control operations of the computer 100 pursuant to the instructions.

Figure 2:
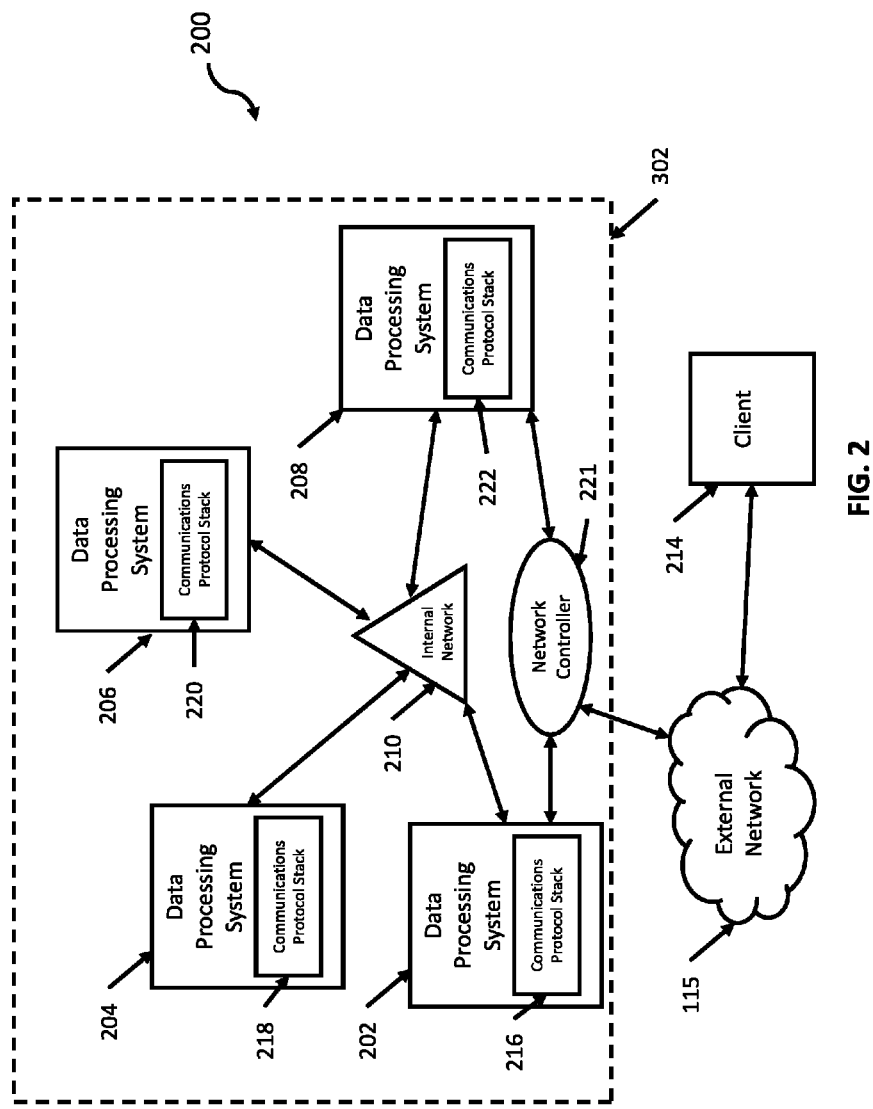
FIG. 2 depicts a computing environment for packet forwarding optimization across multiple nodes utilizing a single internet protocol (IP) address in accordance with an exemplary embodiment.

Referring now to FIG. 2, an exemplary computing environment 200 for packet forwarding optimization is depicted, according to some embodiments. A cluster of data processing systems is illustrated as a cluster of nodes in a Sysplex 302. As seen in FIG. 2, several data processing systems 202, 204, 206, and 208 can be interconnected in Sysplex 302 via an internal network 210. Sysplex 302 may also connect to a client device 214 via an external network (e.g., network 115).

According to some embodiments, Sysplex 302 may include a cluster of mainframe computer systems (e.g., data processing systems 202, 204, 206, and 208) which may be acting together as a single system image with the mainframe operating systems within Sysplex 302. Data processing systems 202, 204, 206, and 208 illustrated in FIG. 2 may be operating system images, such as the International Business Machines (IBM) z/OS images, executing on one or more computer systems. While the present invention will be described primarily with respect to an IBM z/OS operating system executing in a z/OS environment, the data processing systems 202, 204, 206, and 208 may be mainframe computers, mid-range computers, servers, or other systems having operating systems capable of supporting dynamic routable Virtual IP Addresses and which are capable of error recovery as described herein.

Figure 3:
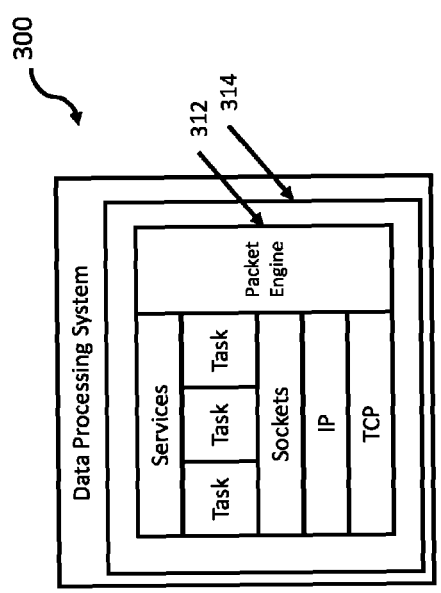
FIG. 3 depicts a block diagram of an exemplary data processing system in accordance with an exemplary embodiment.

As is further illustrated in FIG. 2, the data processing systems 202, 204, 206, and 208 may have associated with them communication protocol stacks 216, 218, 220, and 222, respectively, which may be TCP/IP stacks. In some aspects, communication protocol stacks 216, 218, 220, and 222 may be modified to incorporate a packet engine. FIG. 3 depicts an exemplary data processing system with greater detail.

Referring briefly to FIG. 3, an exemplary data processing system 300 is depicted, in accordance with some embodiments. Data processing system 300 may include a communication protocol stack 314. Communication protocol stack 314 may be controlled and/or optimized by a packet engine 312. In some aspects, packet engine 312 may be a VIPA distribution function operating as part of z/OS for providing dynamic routable VIPAs (DVIPAs), which may provide a single IP address for multiple communication protocol stacks (e.g., communication protocol stacks 216, 218, 220, and 222).

Referring again to FIG. 2, while each of the communication protocol stacks 216, 218, 220, and 222 are depicted as part of data processing systems 202, 204, 206, and 208, respectively. In some aspects, not all communication protocol stacks in a Sysplex (e.g., Sysplex 302) need incorporate the packet engine 312. Thus, some embodiments may be carried out on any system where two or more communication protocol stacks in a cluster of data processing systems support packet engines such as, for example, dynamic routable VIPAs. In the case of VIPAs, if a communication protocol stack does not support DVIPAs, then the dynamic routable VIPA messages according to the present invention may be ignored by the communication protocol stack. Thus, some embodiments may include backward compatibility with existing communication protocol stacks.

Utilizing the above described system configuration as an example, in some aspects packet engine 312 may be a DVIPA distribution function. The DVIPA distribution function may allow for protocol stacks that Sysplex 302 can define as supporting DVIPA. In some aspects, DVIPA may provide ability to assign a specific VIPA to a data sharing group and to each member of the group. This address may be independent of any specific communications protocol stack within the Sysplex 302. DVIPAs may share and communicate with network 115 through a routing protocol stack such that all protocol stacks having a server application which is associated with the DVIPA will appear to the network 115 (and thus, client 214) as a single IP address.

Computing environment 200 may provide DVIPAs by designating a protocol stack (e.g., communications protocol stack 216), as a routing protocol stack, notifying other protocol stacks (e.g., communications protocol stacks 218, 220, and 222) of the routing protocol stack 216, and having the other protocol stacks notify the routing protocol stack when an application which registers to the DVIPA is started. Because Sysplex 302 may route communications to the DVIPA through the routing protocol stack, the routing protocol stack may provide work load balancing by distributing connections to the other protocol stacks which bind to the DVIPA to balance workload. Furthermore, in some embodiments, computing environment 200 may provide scalability and availability by allowing all protocol stacks for z/OS images which execute applications that may bind to the DVIPA. In some aspects, Sysplex 302 may route the communications through the assigned routing protocol stack to establish the routing path without user intervention. Sysplex 302 may route communications via packet engine 312. Further aspects of packet engine 312, according to embodiments, may allow automated movement of a routing protocol function to a backup stack.

Packet engine 312 may configure communication protocol stacks 216, 218, 220, and 222 as to which stacks are routing stacks, backup routing stacks and server stacks. Different DVIPAs may have different sets of backup stacks, possibly overlapping. The definition of backup stacks may be the same as that for the VIPA takeover function described in U.S. Pat. No. 7,430,611 B2, entitled "SYSTEM HAVING A SINGLE IP ADDRESS ASSOCIATED WITH COMMUNICATION PROTOCOL STACKS IN A CLUSTER OF PROCESSING SYSTEMS," which is incorporated herein by reference as if set forth fully herein.

Referring still to FIG. 2, communication protocol stacks 216, 218, 220, and 222 may communicate with each other through internal network 210, which may be configured as a coupling facility of internal network 210 by utilizing XCF messaging. Furthermore, 216, 218, 220, and 222 may communicate with an external network 115 (operating outside of Sysplex 302) such as the Internet, an intranet, a Local Area Network (LAN), or Wide Area Network (WAN) utilizing a connecting node via network controller 221.

According to some embodiments, internal network 210 may be an IBM Enterprise System Connectivity (ESCON) module and/or the like. An ESCON, for example, is a data connection created by IBM, and may be used to connect mainframe computers to peripheral devices such as disk storage and tape drives, external networks, etc. Connecting node 220 may include an optical fiber, half-duplex, serial interface. Thus, a client 214 may, utilize network 115 to communicate with an application executing on an z/OS image in Sysplex 302 through the communication protocol stacks 216 and 222, which may function as routing protocol stacks as described herein.

Network controller 221 may be configured as an independent data processing system having an independent communication protocol stack. Network controller 221 may be configured to communicate with external client 214 through a network adaptor, such as for example, an IBM Open Systems Adapter (OSA) card or the like. An OSA adapter may include a family of integrated hardware features that may enable direct connection between IBM System z/OS hosts and clients (e.g., data processing systems 202, 204, 206, and 208) on local area networks (LANs). In some instances, an OSA adaptor may provide a virtual interface to the LAN that may be shared by hundreds of host operating systems and/or nodes. The router may be embodied in the OSA Ethernet data router ASIC (application-specific integrated circuit) chipset and may be packaged in a plurality of configurations.

When a TCP/IP stack initializes a network interface to a network controller (e.g., network controller 221), it may register various types of TCP/IP information with which network controller 221 may use for packet routing. For TCP routing, this information can be any information contained in the IP or TCP header portion of the packet. According to some embodiments, network controller 221 may route data packet traffic using the data in the received packet.

Figure 4:
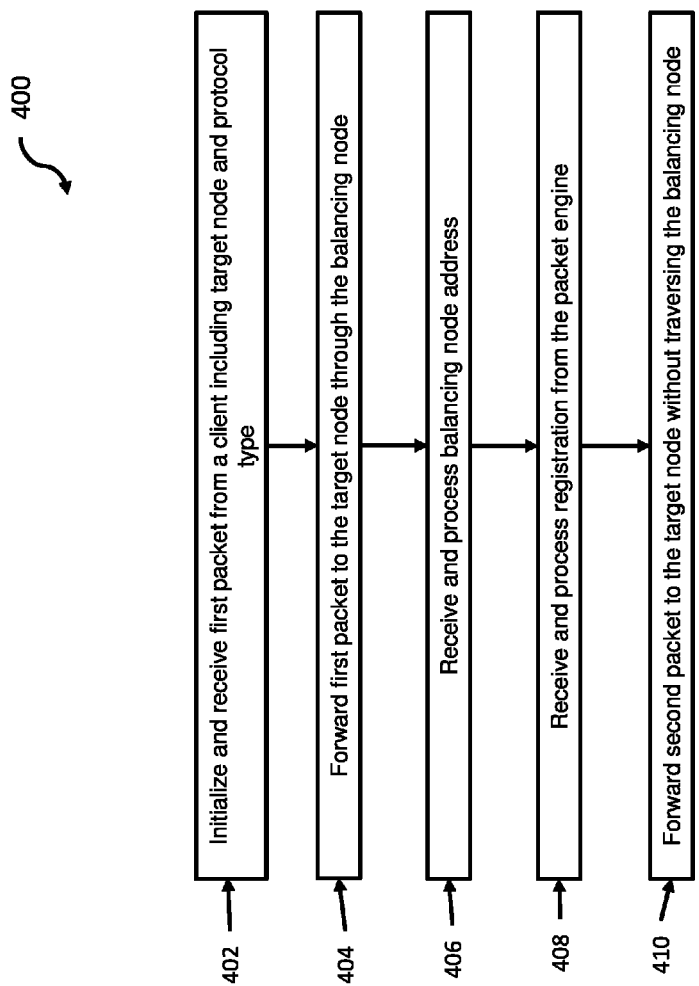
FIG. 4 depicts a flow diagram of a method for packet forwarding optimization across multiple nodes in accordance with an exemplary embodiment.
Figure 5:
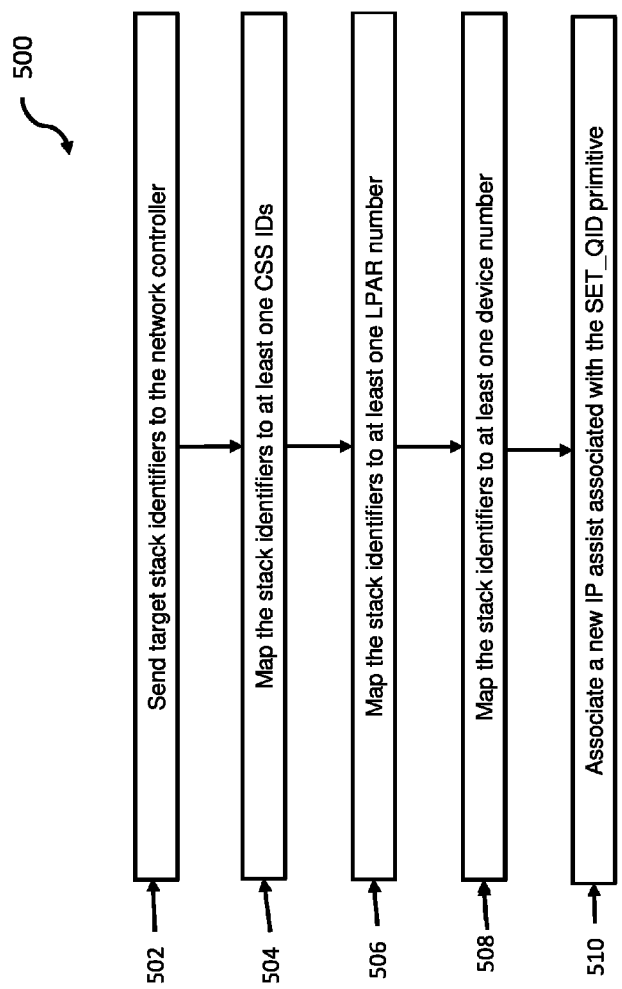
FIG. 5 depicts a method for initializing network controller in accordance with an exemplary embodiment.

Referring now to FIG. 4, a flow diagram of a method 400 for packet forwarding optimization across multiple nodes utilizing a single internet protocol (IP) address is depicted, in accordance with an exemplary embodiment. Prior to establishing a TCP/IP connection, network controller 221 may have only the IP address information and the IP protocol which can be used for packet routing. Packet distribution engine 312 may be a Sysplex Distributor function which may register an IP address in conjunction with the IP protocol type of the TCP to network controller 221. As shown at block 402, network controller 221 may initialize the connection and receive a first packet. During network initialization of controller 220, each communications protocol stack from Sysplex 302 may send network controller 221 a list of the target stack ID addresses. FIG. 5 depicts a method for initializing network controller 221.

Referring briefly to FIG. 5, the target stack ID addresses may include unique target stack identifiers, such as, for example, dynamic XCF identifiers which may include IP addresses that may include the target node. As shown at block 502, network controller 221 may receive target stack identifiers from the Sysplex communications protocol stacks. In some aspects, as shown at block 504, each of the communications protocol stacks may map the stack identifiers to at least one content search services identification (CSS ID). Sysplex communications protocol stacks may then map the stack identifiers to at least one local partition (LPAR) number in the Sysplex, as shown at block 506. As shown in block 508, the Sysplex communications protocol stacks may also map the stack identifiers to at least one device number in the Sysplex. At block 510, Referring again to FIG. 4, after initialization, as shown in block 402, network controller 221 may receive a first packet from client 214. In some embodiments, the first packet may include information indicative of a target node and a protocol type. For example, network controller 221 may parse a frame received from client 214 over network 115 and use a list of previously received destination identifiers to distribute the frame to a target stack.

In some aspects, packet engine 312, which may be embodied as a Sysplex TCP/IP stack, may send the network controller 221 a list of the target node ID addresses. The ID addresses may be, for example dynamic XCF identifiers operating within Sysplex 302 that share network controller 221. Accordingly, as shown at block 404, network controller 221 may receive a balancing node address from packet engine 312. Network controller 221 may receive and process a balancing node address from packet engine 312, as shown at block 406.

In some aspects, as shown at block 408, network controller 221 may receive and process a registration from packet engine 312, and save the registration to a network controller queue operating on network controller 221. According to some embodiments, the registration can include a 5 Tuple that may include an IP protocol type, an originating node address, a target node address, an originating node port number, and target node port number. In some aspects, the registration information can effectively remove work from the distributing stack (e.g., the balancing node), by pushing the data flow processing through network controller 221, which then routes data directly to the target node without passing through an intermediary balancing node (which may be operating as an intermediate distributing stack). Network controller 221, which may be shared between the distributing stack and the target stack, may forward future packets directly to the target and bypassing the distributor. Forwarding now happens from network controller 221 without traversing the distributing stack.

Accordingly, as shown in block 410, network controller 221 may forward future packets to the target node without traversing the balancing node (e.g., the intermediate distributing stack). In some aspects, network controller 221 may forward all future packets received that match the 5 Tuple information in the registration step.

Figure 6:
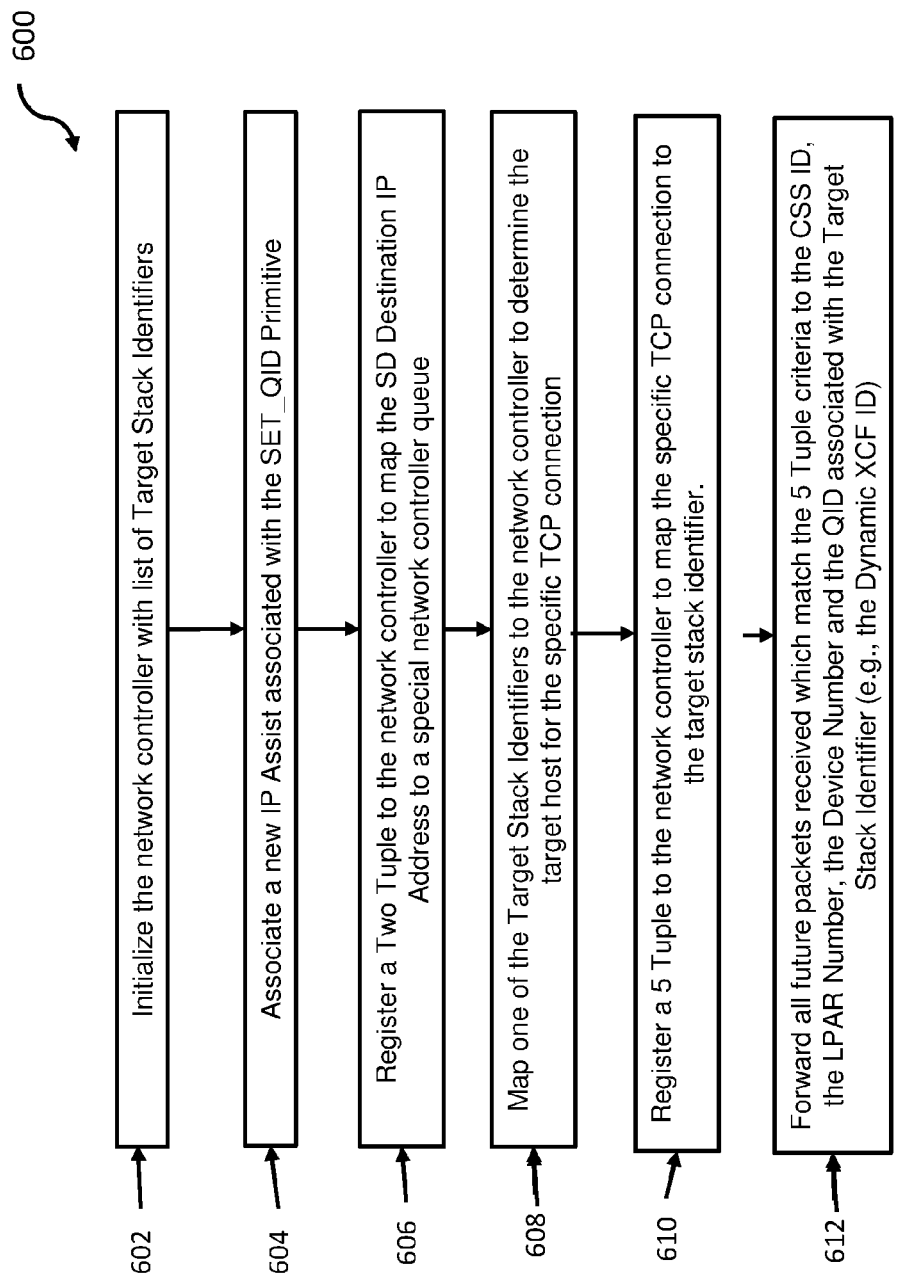
FIG. 6 depicts a computer-implemented method for packet forwarding optimization across multiple nodes utilizing a single internet protocol (IP) address in accordance with an exemplary embodiment.

Referring now to FIG. 6, according to another embodiment, a computer-implemented method for packet forwarding optimization across multiple nodes utilizing a single internet protocol (IP) address is considered. As shown at block 602, network controller 221 may initialize by receiving target stack identifiers from the Sysplex communications protocol stacks. According to some embodiments, the Sysplex communications protocol stacks may operate independently or collectively as a Sysplex Distributor system. In some aspects, each of the communications protocol stacks may map the stack identifiers to at least one CSS ID. Sysplex communications protocol stacks may then map the stack identifiers to at least one LPAR number in the Sysplex. In some embodiments, the Sysplex communications protocol stacks may also map the stack identifiers to at least one device number in the Sysplex.

As shown in block 604, network controller 221 may next associate a new IP Assist with the SET_QID primitive. In some aspects, one or more communications protocol stacks operating as the Sysplex Distributor may define the SET_QID primitive defined to map the XCF IDs to network controller 221.

At block 606, Sysplex Distributor may register with network controller 221 a Two Tuple which may be configured to map the Sysplex Distributor Destination IP address to a special network controller queue on network controller 221.

As shown in block 608, the Sysplex Distributor may map one of the Target Stack Identifiers to network controller 221 to determine the target host for the specific TCP connection.

In some embodiments, the SET_QID Primitive, which may be configured to perform the registration to network controller 221, may need to be modified by Sysplex Distributor to pass the Dynamic XCF ID to network controller 221. Accordingly, at block 710, Sysplex Distributor may register a 5 Tuple to network controller 221 to map the specific TCP connection to the specific Dynamic XCF identifier.

As seen at block 612, network controller 221 may forward all future packets received that match the 5 Tuple criteria to the CSS ID, the LPAR Number, the Device Number and the QID associated with the Target Stack Identifier (e.g., the Dynamic XCF ID).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for packet forwarding optimization across multiple nodes utilizing a single internet protocol (IP) address, comprising:
- receiving, via a processor on a network controller, a first packet from a client, wherein the first packet includes information indicative of a target node and a protocol type;
- receiving, via the processor, a balancing node address of a balancing node from a packet engine;
- forwarding, via the processor, the first packet to the target node though the balancing node according to the balancing node address, a target node address, and the protocol type, wherein the forwarding the first packet to the target node is based on the target node address and the protocol type;
- receiving, via the processor, a registration from the packet engine, and saving the registration to a network controller queue, wherein the registration comprises the target node address mapped by the packet engine, wherein the registration does not include the balancing node address; and
- forwarding, via the network controller queue, a second packet to the target node based on the registration without the second packet traversing the balancing node,
- wherein the target node and the balancing node utilize the single IP address, and the client has an IP address different from the single IP address.

* * * * *